United States Patent [19]

Hellmer et al.

[11] Patent Number: 4,991,695
[45] Date of Patent: Feb. 12, 1991

[54] HYDRAULIC BRAKE SYSTEM FOR A LARGE ROTATING MASS

[75] Inventors: Ernest W. Hellmer, Chicago; Frank W. Pfohl, Westmont, both of Ill.

[73] Assignee: Continental Plastic Containers, Norwalk, Conn.

[21] Appl. No.: 749,215

[22] Filed: Jun. 27, 1985

[51] Int. Cl.$^5$ .............................................. F16D 55/18
[52] U.S. Cl. .................................. 188/72.4; 188/71.1; 188/106 R
[58] Field of Search .................... 188/71.1, 72.4, 72.5, 188/106 P, 106 R; 303/6 A, 114

[56] References Cited

U.S. PATENT DOCUMENTS

| | | | |
|---|---|---|---|
| 3,569,658 | 9/1969 | Forsythe | 188/72.4 |
| 3,990,544 | 11/1976 | Vijan et al. | 188/72.4 |
| 4,395,072 | 7/1983 | Belart | 303/114 |

FOREIGN PATENT DOCUMENTS 3208393 9/1983 Fed. Rep. of Germany ..... 303/6 A

Primary Examiner—Matthew C. Graham
Attorney, Agent, or Firm—Charles E. Brown; Paul Shapiro; Charles A. Brown

[57] ABSTRACT

This relates to a hydraulic brake system particularly adapted for use in conjunction with large rotating masses. The system includes at least two calipers which are widely spaced. In accordance with the system, there is positioned adjacent each caliper a solenoid valve and there is at each valve a constant supply of hydraulic fluid under pressure so that when the valve is actuated there is an immediate supplying of hydraulic fluid under pressure to each caliper. The arrangement permits an early response time as compared to systems wherein the system must be pressurized from a remote source.

3 Claims, 1 Drawing Sheet

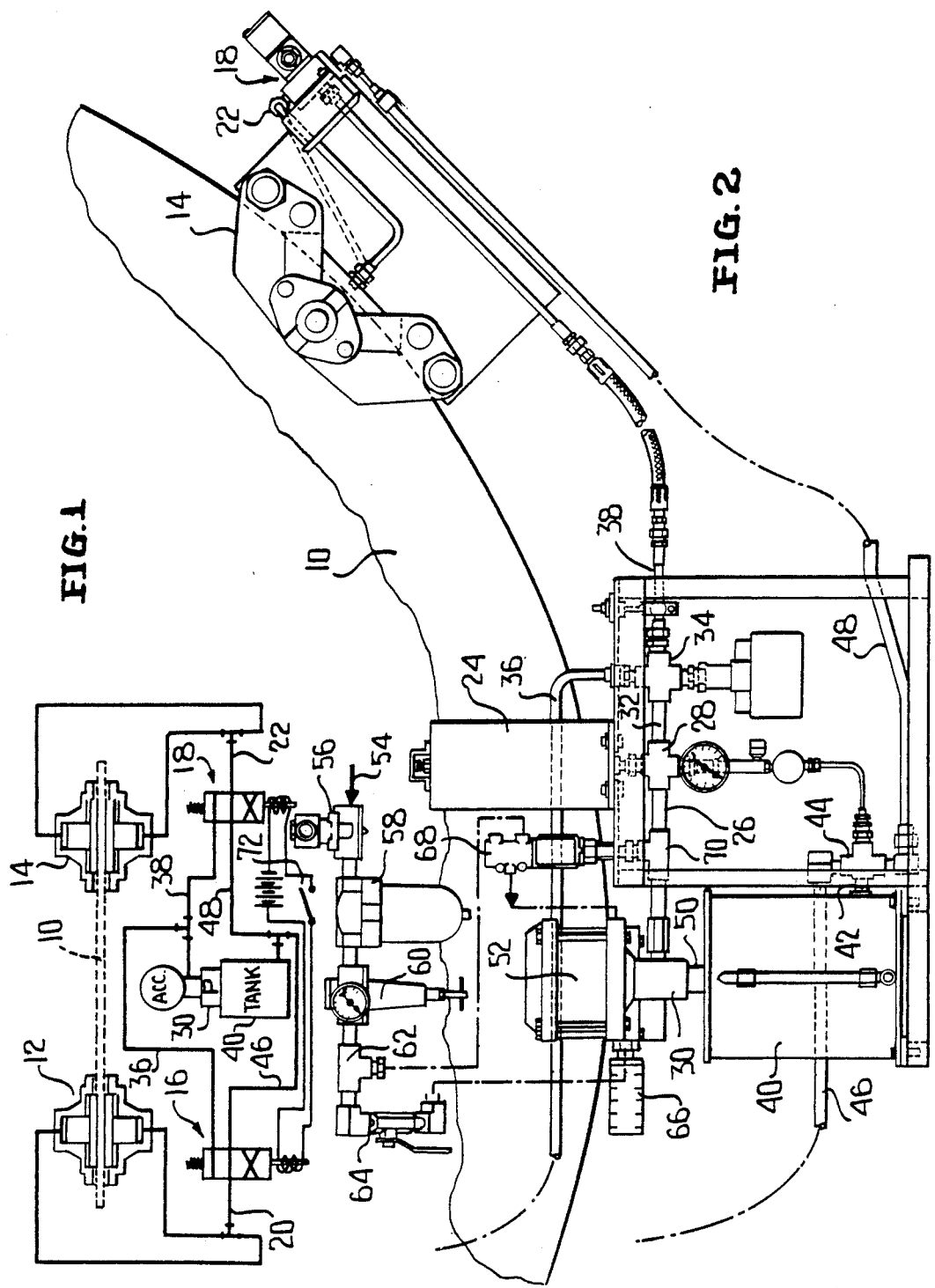

HYDRAULIC BRAKE SYSTEM FOR A LARGE ROTATING MASS

This invention relates in general to new and useful improvements in hydraulic brake systems, and more particularly to a hydraulic brake system for a large rotating mass. Most specifically, this invention relates to a hydraulic brake system for a blow molding machine of the wheel type wherein plural molds are mounted for rotation in unison about a horizontal axis.

Blow molding machines of the rotating wheel type normally continuously rotate. However, when a mishap or a malfunction occurs, it is desirable to stop the machine as quickly as possible.

In the past, such blow molding machines have been equipped with a rotor and a caliper. However, when the hydraulic fluid is directed to the caliper in the normal manner of hydraulic brakes, there is an appreciable time lag between the actuation of the brake and the gripping of the rotor by the caliper due to the fact that the hydraulic fluid in a relatively long line must be pressurized.

In accordance with this invention, the time lag problem has been effectively solved by maintaining at all times a supply of hydraulic fluid under pressure, and maintaining that pressure in the hydraulic fluid in the hydraulic lines going to the calipers except for a very short line between a valve and the caliper. A conventional solenoid valve is utilized and when the rotation of the wheel is to be stopped, the solenoid valve at each caliper is actuated to supply the hydraulic fluid from the hydraulic fluid supply line to the caliper with the actuation of the caliper being almost instantaneous.

In accordance with this invention, actuation of the hydraulic brake system is not dependent upon the actuation of a pump. The hydraulic system includes an accumulator which maintains the hydraulic fluid under a pressure at all times. When the pressure in the accumulator drops below a predetermined pressure, an associated pump is actuated so as to pump hydraulic fluid from a supply tank into the system, recharging the accumulator.

The foregoing hydraulic brake system permits a return line from the caliper separate and apart from the hydraulic fluid supply line and this return line is coupled to a supply tank from which the hydraulic fluid is pumped into the system.

The pump is preferably actuated by an air cylinder with air being supplied to the air cylinder when the pressure within the accumulator drops below a certain level.

With the above and other objects in view that will hereinafter appear, the nature of the invention will be more clearly understood by reference to the following detailed description, the appended claims, and the several views illustrated in the accompanying drawing.

FIG. 1 is a schematic view of the hydraulic system in accordance with this invention.

FIG. 2 is an enlarged fragmentary elevational view showing more specifically the details of the hydraulic brake system.

Referring now to the drawings in detail, it will be seen that there is illustrated a very large diameter rotor 10 which is a rigid part of the frame of a customary rotary blow molding machine of the wheel type. It is to be understood that when the machine is operating, the rotor 10 will rotate at a constant speed.

In order that the rotating wheel may be stopped when desired, there is associated with the rotor 10 a pair of remotely disposed calipers 12, 14. The calipers 12, 14 are illustrated as being of the double acting type, but may be of any type and may include plural cylinders on each side.

In accordance with the invention, disposed immediately adjacent each of the calipers 12, 14 is a solenoid control valve. Identical valves 16 and 18 are provided with the valve 16 being positioned adjacent the caliper 12 and the valve 18 being positioned adjacent the caliper 14. The valve 16 is coupled to the caliper 12 by a combination supply and return line 20 while the valve 18 is coupled to the caliper 14 by way of a combined supply and return line 22.

In accordance with this invention, hydraulic fluid under pressure is constantly supplied to the valves 16, 18 from an accumulator 24 wherein hydraulic fluid is maintained at a minimum pressure. The accumulator 24 is coupled to a main hydraulic supply line 26 by way of a cross fitting 28. The main supply line 26 is coupled to a pump 30.

From one arm of the cross fitting 28 there extends a hydraulic line 32 which, in turn, is coupled to yet another cross fitting 34. From this cross fitting 34 there is directed to the valve 16 a supply line 36 within which the hydraulic fluid is maintained under pressure at all times. A similar supply line 38 extends from the cross fitting 34 to the valve 18.

The hydraulic system includes a hydraulic fluid supply tank 40 having an inlet line 42 which carries a cross fitting 44. One hydraulic fluid return line 46 extends from the valve 16 to the cross fitting 44 while a second hydraulic fluid return line 48 extends from the valve 18 to the cross fitting.

The pump 30 is coupled to the supply tank 40 by means of a supply line 50 and has its outlet coupled to the main supply line 26. The pump 30 is actuated by an air cylinder 52 which is of the spring loaded single acting type.

Compressed air is supplied to the system from a compressed air supply 54 which passes through a suitable control valve 56, then through an air line lubricator 58 and into a pressure controller 60. Air from the pressure controller 60 at the desired pressure passes into a T fitting 62 and from one outlet leg of the T fitting 62 to a manual shut-off valve 64. From the manual shut-off valve 64 air for actuating the air cylinder 52 passes to a suitable control valve 66 and then into the air cylinder 52.

Pilot air passes from the other outlet arm of the T fitting 62 to a control valve 68 which is coupled to the main pressurized hydraulic fluid supply line 26 by way of a T fitting 70 so that flow of pilot air from the pilot control valve 68 to the valve 66 may be controlled by the pressure of hydraulic fluid within the system and generally speaking within the accumulator 24.

The system may be provided with suitable gauges, emergency shut-off mechanisms, etc. which do not form a part of the invention and which will not be specifically described here.

As stated above, the valves 16, 18 are of a solenoid control type. Each of the valves 16, 18 has two positions. In the illustrated position of FIG. 1, the combined return and supply line 20 is coupled to the return line 46 by the valve 16. In a like manner, the combined return and supply line 22 is connected to the return line 48 by the valve 18. Thus the calipers 12, 14 are constantly vented to the supply tank 40. At the same time hydraulic fluid under pressure is always available at the valves 16, 18 through the supply lines 36, 38.

It is to be understood that the blow molding machine of which the rotor 10 is a part will be provided with a number of control devices which include a suitable switch mechanism for completing a circuit. A typical switch mechanism is illustrated in FIG. 1 and is identified by the numeral 72. When the switch mechanism is open, the calipers 12, 14 are inoperative. However, when there is a malfunction of the blow molding machine such as to close the switch mechanism 72, the solenoid valves 16, 18 will be energized and shifted to their second positions wherein with respect to the valve 16, the line 20 will be connected to the supply line 36 and with respect to the valve 18, the line 22 will be connected to the supply line 38. Since hydraulic fluid under pressure is immediately available at the valves 16, 18, it will be seen that there will be almost instantaneous actuation of the calipers 12, 14 and a slowing of the rotation of the blow molding machine.

With respect to the quick stopping of the blow molding machine, it is to be understood that the construction of the blow molding machine is such that there must be a controlled stopping of the rotation by the gripping of the rotor 10 by the calipers 12, 14. There cannot be an instantaneous stopping and, therefore, the delay in actuation of the calipers 12, 14, if any, is critical. Thus an instantaneous actuation of the calipers 12, 14 is extremely important.

At this time it is pointed out that the construction of the calipers 12, 14 may be varied. The same is true of the solenoid valves 16, 18.

Although only a preferred embodiment of the hydraulic brake system has been specifically illustrated and described herein, it is to be understood that minor variations may be made therein without departing from the spirit and scope of the invention as defined by the appended claims.

We claim:

1. A hydraulic brake system for a large rotating mass, said system comprising at least one rotor and at least two remotely positioned calipers, a central source of hydraulic fluid under pressure, hydraulic lines having hydraulic fluid therein under pressure leading from said source to valves located adjacent to each of said calipers, hydraulic lines normally not under pressure leading from said valves to respective ones of said calipers, and control means remote from said valves coupled to said valves for actuating said valves in unison whereby substantially instantly actuation of said calipers may be effected upon actuation of said control means, said system including a supply tank, and return lines from said calipers to said valves and from said valves to said supply tank, said system including a hydraulic pump coupled to said supply tank for receiving hydraulic fluid from said supply tank and to said hydraulic lines, said source of hydraulic fluid under pressure being an accumulator receiving hydraulic fluid under pressure from said pump and storing said hydraulic fluid under pressure, said pump having an actuator responsive to the pressure of hydraulic fluid in said accumulator.

2. A hydraulic brake system according to claim 1 wherein said pump actuator is an air cylinder.

3. A hydraulic brake system according to claim 1 wherein said pump actuator is an air cylinder, and air supply to said air cylinder is controlled by an air valve responsive to the pressure of hydraulic fluid in said accumulator.

* * * * *